United States Patent
Feuchtinger et al.

(10) Patent No.: US 7,376,416 B2
(45) Date of Patent: May 20, 2008

(54) SUBSCRIBER RADIOTELEPHONE TERMINAL UNIT AND TERMINALS FOR SUCH UNITS

(75) Inventors: Stefan Feuchtinger, Munich (DE); François Olivier, Plobsheim (FR); Guillermo Jurado De Mira, Truchtersheim (FR); Jean-Luc Steffann, Strasbourg (FR)

(73) Assignee: Alcatel, Paris (FR)

( * ) Notice: Subject to any disclaimer, the term of this patent is extended or adjusted under 35 U.S.C. 154(b) by 1549 days.

(21) Appl. No.: 09/740,784

(22) Filed: Dec. 21, 2000

(65) Prior Publication Data

US 2001/0009845 A1 Jul. 26, 2001

(30) Foreign Application Priority Data

Jan. 24, 2000 (FR) .................................. 00 00837

(51) Int. Cl.
*H04Q 7/20* (2006.01)
(52) U.S. Cl. .................. 455/426.1; 455/465; 455/434; 455/552.1
(58) Field of Classification Search ............... 455/3.05, 455/11.1, 465, 553.1, 417, 422.1, 552.1, 462, 455/561, 554.2, 554.1, 555, 426.1, 424, 439, 455/432.2, 436, 440, 445, 450, 426.2, 447, 455/437, 420, 434, 446, 16, 90.2, 556.1
See application file for complete search history.

(56) References Cited

U.S. PATENT DOCUMENTS

| | | | | |
|---|---|---|---|---|
| 5,675,629 A | * | 10/1997 | Raffel et al. ............. | 455/552.1 |
| 5,794,141 A | * | 8/1998 | Zicker ....................... | 455/418 |
| 5,812,955 A | * | 9/1998 | Dent et al. ................ | 455/561 |
| 5,842,122 A | * | 11/1998 | Schellinger et al. ........ | 455/403 |
| 5,875,395 A | * | 2/1999 | Holmes ....................... | 455/420 |
| 5,911,120 A | * | 6/1999 | Jarett et al. ................ | 455/417 |
| 5,983,073 A | * | 11/1999 | Ditzik ........................ | 455/11.1 |
| 5,983,100 A | * | 11/1999 | Johansson et al. ....... | 455/426.1 |
| 6,052,595 A | * | 4/2000 | Schellinger et al. ........ | 455/450 |
| 6,141,547 A | * | 10/2000 | Rousseau et al. ........ | 455/426.1 |

(Continued)

FOREIGN PATENT DOCUMENTS

DE 43 10 230 A1 6/1994

(Continued)

OTHER PUBLICATIONS

Alvesalo, A.: "Dect System as an extension to GSM Infrastructure" MRC Mobile Radio Conference, Nov. 13, 1991, pp. 201-206, XP000613490.

*Primary Examiner*—Nay Maung
*Assistant Examiner*—John J. Lee
(74) *Attorney, Agent, or Firm*—Sughrue Mion, PLLC

(57) ABSTRACT

A radiotelephone terminal unit is provided for a subscriber who has a portable radiotelephone terminal of the mobile network type or cordless telephone type which can be carried around by a user and by means of which the user communicates via a communication network to which the user is connected by radio via a relay transceiver station. The unit includes a radiotelephone terminal which is complementary to the portable radiotelephone terminal, preferably remains in place, and can be used conjointly with the portable radiotelephone terminal when connected to the relay transceiver station by a call set up via the station. Complementary functions of the two terminals can be employed by the same user having simultaneous access to both terminals.

18 Claims, 2 Drawing Sheets

U.S. PATENT DOCUMENTS

| | | | |
|---|---|---|---|
| 6,167,278 A * | 12/2000 | Nilssen | 455/462 |
| 6,356,762 B1 * | 3/2002 | Guenther | 455/456.4 |
| 6,438,384 B1 * | 8/2002 | Chen | 455/462 |
| 6,546,262 B1 * | 4/2003 | Freadman | 455/557 |
| 6,574,488 B2 * | 6/2003 | Oba et al. | 455/566 |
| 6,708,028 B1 * | 3/2004 | Byrne | 455/426.1 |

FOREIGN PATENT DOCUMENTS

| | | |
|---|---|---|
| EP | 0 849 965 A1 | 6/1998 |
| WO | WO 95/23485 | 8/1995 |

\* cited by examiner

SUBSCRIBER RADIOTELEPHONE TERMINAL UNIT AND TERMINALS FOR SUCH UNITS

BACKGROUND OF THE INVENTION

1. Field of the Invention

The invention relates to a subscriber radiotelephone terminal unit and more particularly to a unit for a subscriber having a radiotelephone terminal of the mobile network type or the cordless telephone type. It also relates to subscriber radiotelephone terminals intended to be included in such units.

2. Description of the Prior Art

Portable radiotelephone terminals, commonly referred to as mobile telephones, are small units carrying manual controls whose number is necessarily limited by the lack of space. The situation is practically the same with cordless telephones even if the unit constituting the portable part and incorporating the audio handset can more easily be made larger.

The limited number of controls that can be made available to the user on a given radiotelephone terminal rapidly complicates the operations to be effected, for example if the user wishes to use the 12 keys of the alphanumeric keypad of a mobile terminal to enter an alphanumeric message exceeding more than a few characters.

The user of a mobile telephone or a cordless telephone handset must hold the unit near their mouth and ear in order to speak and listen, which in practice means that they cannot see the keys or the display screen or use the keypad when speaking or listening.

SUMMARY OF THE INVENTION

The present invention therefore proposes a radiotelephone terminal unit for a subscriber who has a portable radiotelephone terminal of the mobile network type or cordless telephone type which is adapted to be carried around by a user and by means of which the user communicates via a communication network to which the user is connected by radio via a relay transceiver station, which unit includes a radiotelephone terminal which is complementary to the portable radiotelephone terminal, preferably adapted to remain in place, and can be used conjointly with the portable radiotelephone terminal when connected to the relay transceiver station by a call set up via the station, and in which unit complementary functions of the two terminals can be employed by the same user having simultaneous access to both terminals.

The invention also proposes a subscriber radiotelephone terminal including means enabling it to communicate by radio with a radiotelephone relay transceiver station providing access to a communication network and/or with another radiotelephone terminal, which subscriber radiotelephone terminal includes hardware and/or software means enabling it to communicate by radio with and/or via the relay transceiver station either directly or via another subscriber radiotelephone terminal with which it is in direct radio communication, and functional means which are complementary to those of the complementary other radiotelephone terminal and organized so that they can be used with those of the complementary terminal by the same user during a call already set up or being set up with or via the relay transceiver station.

The invention, its features and its advantages are explained in the following description, which is given with reference to the accompanying drawings.

DETAILED DESCRIPTION OF THE PREFERRED EMBODIMENT

Figure 1:
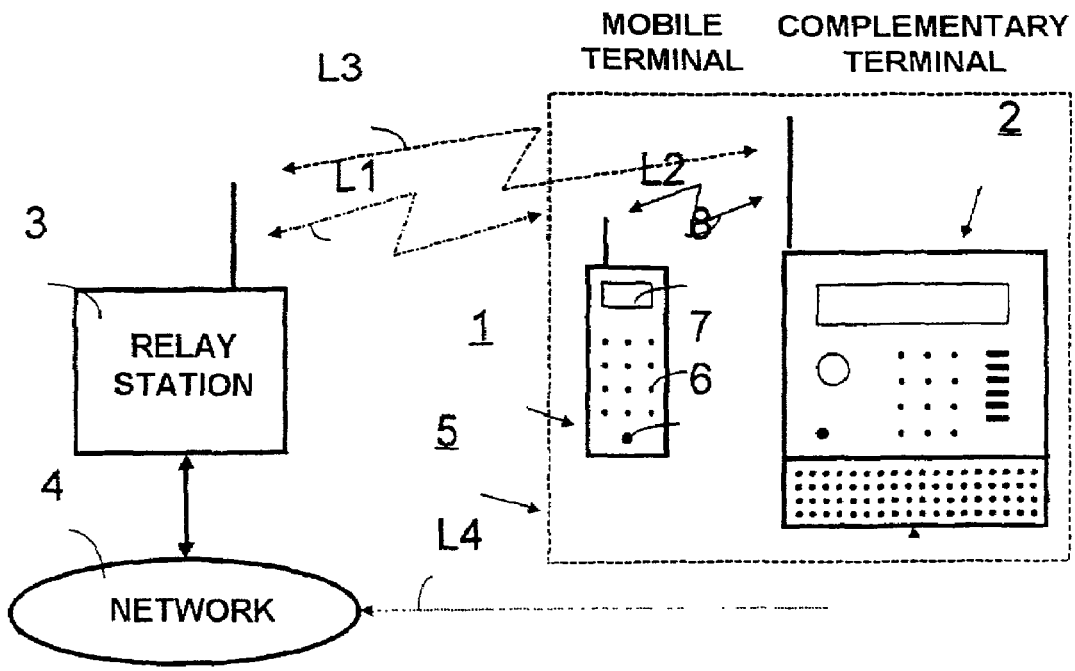
FIG. 1 is a block diagram showing, in a communication system according to the invention, the various connection options between a radiotelephone station connected to a communication network and a subscriber radiotelephone terminal unit. The subscriber radiotelephone terminal unit includes a mobile terminal intended to be carried around by the user and a complementary terminal intended to remain In place.

The subscriber terminal unit for a communication system shown in FIG. 1 combines a portable radiotelephone terminal 1 of the cordless telephone handset or mobile network type which takes the form of a unit designed to be held near the head of the user when communicating and a complementary terminal 2 which is usually a desktop or wall-mounted terminal. The complementary terminal constitutes a home station, for example. The two terminals are designed to be used in conjunction by a user to communicate by means of the mobile terminal 1 via a communication network 4 to which the mobile terminal 1 is linked by radio. For example, a call is set up via a unit referred to herein as a relay radiotelephone transceiver station 3, either directly as symbolized by the radio link L1 for the mobile terminal 1 or via the mobile terminal 1 from the complementary terminal 2, as symbolized by the radio links L2 and L1 respectively set up between the terminals 1 and 2, on the one hand, and between the terminal 1 and the relay transceiver station 3, on the other hand. It can also be set up via a radio link L3 set up between the complementary terminal 2 and the relay station 3. Apart from these various connection options, which can correspond to different subscriber terminal unit configurations and/or different operating conditions, it is also envisaged that, at least in one particular configuration of the subscriber terminal unit, a call can involve a complementary terminal 2 connected to the communication network 4 by a cable link L4, for example a landline telephone link.

The terminals 1 and 2 together form a communication terminal unit 5 made available to a subscriber, for example a DECT, CT0 or CT1 cordless telephone, including a home station (fixed part) corresponding to the complementary terminal 2 and a cordless handset (mobile part) with control keys and corresponding to the mobile terminal 1. The handset and the home station are each equipped with a man-machine interface which includes, for example, an audio module incorporating a microphone 6 and an earpiece or loudspeaker, a keypad 7 and/or a display screen 8 such as an LCD screen.

The terminal unit 5 can also be a subscriber radiotelephone unit of a radiotelephone network, in particular a mobile telephone network such as a GSM network. The mobile terminal 1 is then a pocket (mobile) device which can communicate by radio with a relay transceiver station, such as the station 3, and possibly with a complementary terminal 2, depending on the terminal unit configuration chosen. The communication facility depends on the situation of the mobile terminal 1 and its ability to transmit to and/or receive from the complementary terminal 2 and the relay transceiver station in whose area it is located, when it is within radio range.

Figure 2:
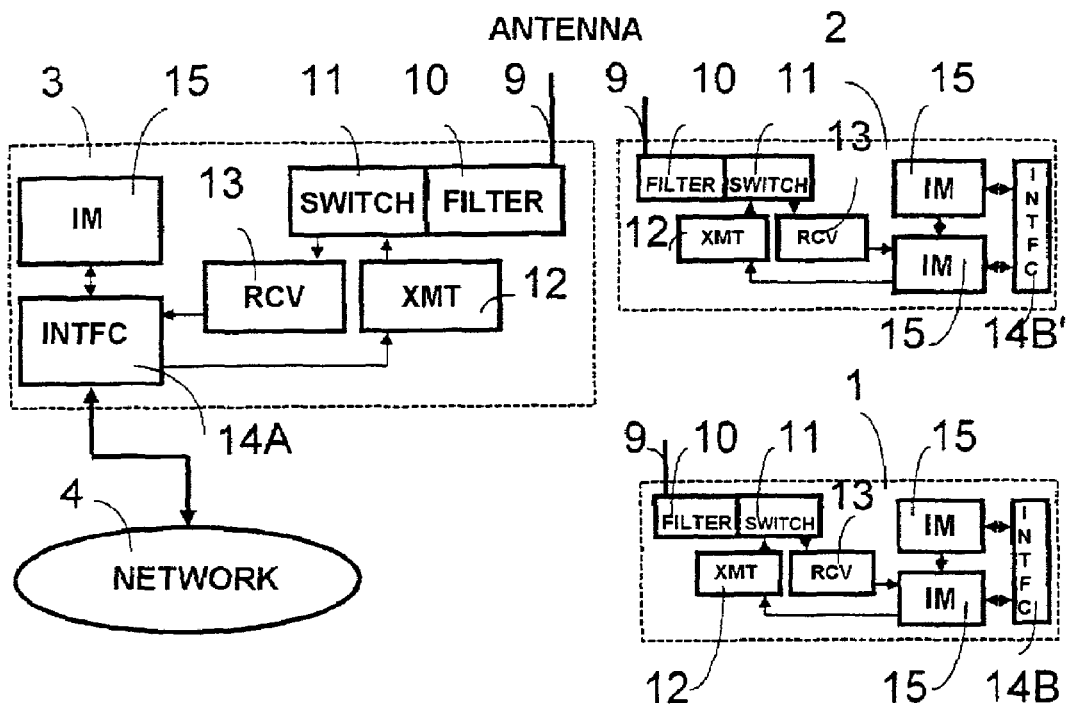
FIG. 2 is a block diagram relating to a communication system and showing more particularly the essential components of a relay radiotelephone transceiver station and a subscriber terminal unit including two complementary radiotelephone terminals according to the invention.

FIG. 2 is a diagram showing the essential components of a radiotelephone relay transceiver station 3 and a subscriber terminal unit 5 including two complementary subscriber radiotelephone terminals that can be used conjointly. As already indicated, the unit is obtained by combining a mobile terminal 1, which is intended to be carried around by the user, and a complementary terminal 2, which is intended to remain in place.

Each of the three entities (the relay station and the two radiotelephone terminals) is designed to set up and clear down radiotelephone calls and to transmit and receive radio signals during radiotelephone calls via an individual antenna 9. To this end, each antenna is connected by an individual radio frequency filter 10 and an individual antenna switch 11 to a transmit module 12 and to a receive module 13 of the entity incorporating it. The transmit module 12 and the receive module 13 of each entity are connected to a dedicated communication interface. The communication interface is an interface 14A providing access to a communication network 4 when the entity concerned is a relay transceiver station 3, as envisaged herein above. It is a man-machine communication interface 14B or 14B' when the entity concerned corresponds to one or other of the two complementary subscriber terminals 1, 2. As already indicated above, the interfaces 14B, 14B' of the complementary terminals 1 and 2 differ in practice in terms of the interaction means they make available to the user. The interaction means 15, and in particular the control and display means, of the complementary terminal 2, which is intended to remain in place, are preferably more extensive and/or sophisticated than those of the terminal 1, for which they can be substituted or which they can complement for particular user operations. The entities constituted by the relay station 3 and the terminals 1 and 2 are each managed by a respective and specifically programmed logic unit which supervises all of the operations effected by the entity which includes it, in conjunction with the control logic of the other entities, during radiotelephone calls to be set up, already set up, or to be cleared down.

In a first embodiment of the invention (see FIG. 3) a mobile terminal 1' and a complementary terminal 2' take the form of a mobile station and a home station for the mobile station and are associated with the same fixed radiotelephone base transceiver station 3', relative to which the terminals 1 and 2 form a single terminal unit 5' which has a single calling number. The control logic of the relay transceiver station 3' is organized, and in particular programmed, to treat the various radiotelephone signals produced by the mobile terminal 1' and by the complementary terminal 2' as if they came from the same terminal. Each of the terminals 1' and 2' is organized, and has a control unit specifically programmed, to take account of signals specifically addressed to it among all the radiotelephone signals transmitted by the relay transceiver station 3' to the terminal unit 5' that the two terminals 1' and 2' constitute when they are within radio range of each other. The programming of at least one of the two terminals 1 and 2 can be completed when they are activated, or by the user, possibly with the assistance of an expert, as and when required. In this example the programming is such that both terminals can be active simultaneously in the same call and more particularly so that at least some of the signals transmitted to the relay transceiver station can come from either of the two terminals 1' and 2' during a call that has been set up. For the purposes of complementarity, the terminals are then in respective positions such that they can be operated simultaneously by the same user. For practical reasons, and in particular for portability, a small display and/or a small number of control keys are normally all that can be provided on a terminal consisting of a GSM mobile telephone or a cordless telephone handset. The limits on screen size and the number of keys are much less severe in the case of a desktop or wall-mounted terminal 2', such as a home station. Thus in the example shown in FIG. 3, the home station constituting the station 2' has a sophisticated man-machine interface including various interface units, for example a telephone dialing keypad 7'A with 12 keys, an alphanumeric keyboard 7'B for entering text, a series of dedicated control keys 7'C., a display 8'A of significantly greater size than a mobile telephone display 8', and means for picking up and reproducing sound, here symbolized by a microphone 6'A and a loudspeaker 16'A. Because the two terminals 1' and 2' of the same terminal unit 5' are constructed as explained above and active simultaneously, they are programmed so that the units in one of them can be used to the benefit of the other one, at the choice of the user and as and when required. This facility can in particular be used to display a long message on the display 8'A of the home station constituting the terminal 2' if its display capacity is greater than that of the display 8' on the mobile terminal 1'.

The keys of the home station can also be used instead of those of the mobile terminal 1' if this simplifies the operations to be carried out, for example to enter the text of a message to be transmitted via the relay transceiver station 3' to a remote party accessible via the communication network 4'.

It is therefore feasible to access a plurality of telephone services that would be difficult or even impossible to access using only a mobile terminal 1', such access being made possible by a subscriber terminal unit in which that terminal 1' is associated with a complementary terminal 2' specifically designed for this purpose, for example a home station designed for the terminal 1'. The access facilities can be used for various services, in particular voice or data services, or for signaling, supervisory and/or other purposes.

Figure 3:
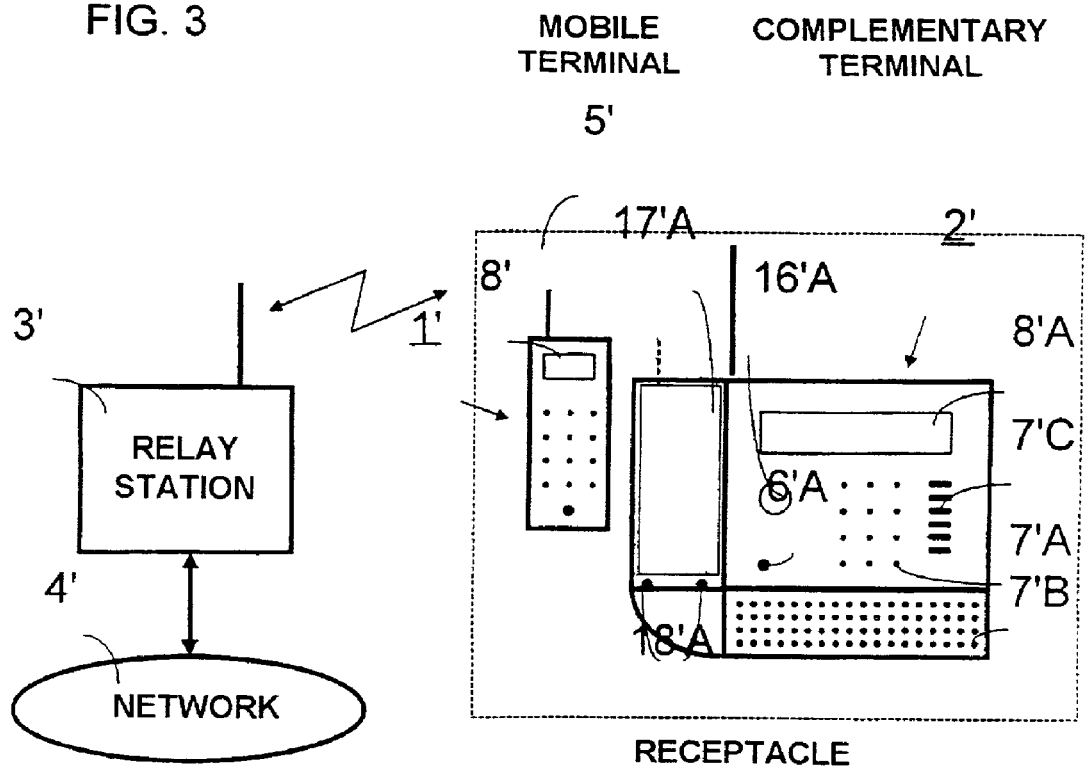
FIG. 3 is a block diagram relating to a communication system including a subscriber radiotelephone terminal unit according to the invention which is made up of two complementary terminals adapted to be operated as a single terminal.

In the embodiment shown in FIG. 3 a home station constituting a terminal 2' can be adapted to receive a mobile terminal 1 which can be placed in a receptacle 17'A when it is not being used. In this example the receptacle is on the front panel of the home station near the man-machine interface units. The receptacle can include electrical connection means 18'A to supply power to a mobile terminal 1' for charging the battery which supplies the terminal 1' with electrical energy.

When the mobile terminal 1' is removed from the receptacle 17'A of the home station, in which it can be stored, it can be taken away from that station and may be at a distance from that station such that it can no longer be used in conjunction with the home station.

In a preferred embodiment of the invention means are therefore provided in the two terminals 1 and 2 or 1' and 2' constituting the same terminal unit to enable at least one of them to determine whether the other one is at a distance enabling them to operate conjointly and complement each other.

At least one of the two terminals of a terminal unit 5 or 5' as described above then has a transmission module including means enabling it to transmit a broadcast control channel carrier of fixed or preferably variable power. The other terminal includes a receive module and means for detecting said broadcast control channel carrier and enabling conjoint use of the terminal provided with said means and the terminal that transmits the broadcast control channel carrier, by the same user, when said carrier is detected. The broadcast control channel carrier transmission means of a terminal unit are incorporated into the terminal that constitutes the home station of the unit, for example, the other terminal then including the means for detecting said carrier. The roles of the terminals can equally well be interchanged. Transmit means and broadcast control channel carrier detector means are then provided in each of the two terminals of the same terminal unit. Each terminal then transmits a different broadcast control channel carrier and includes detector means specifically tuned to the broadcast control channel carrier of the other terminal.

In a preferred embodiment of the invention the home station of a terminal unit is programmed to behave like a conventional DECT terminal, except that when no call is in progress it transmits continuously a broadcast control channel carrier which is analogous to the dummy carrier transmitted by a terminal constituting a DECT system fixed radio part (FRP). The carrier carries a carrier identifier (FRPI) which is transmitted by the home station to enable the mobile terminal to recognize it if there are other units, in particular other home stations within radio range that may transmit the same carrier.

In the embodiment described above, a mobile terminal is programmed to behave like a conventional DECT terminal except that when scanning its environment it looks for a broadcast control channel frequency specific to the home station with which it forms a particular terminal unit if the radiotelephone signals received from that station are received at a power level above a predetermined minimum threshold value. Of course, the same mobile terminal, and in particular the same GSM mobile telephone, can cooperate with one of several home stations, after a choice is made according to the respective levels of the signals received, for example. Alternatively, the mobile terminal 1' and the home station 2' that form a terminal unit, subject to particular radio range conditions, are provided with means enabling each of them to determine symmetrically the level of the signals transmitted by the other of them, in order to enable them to communicate conjointly, should that be possible and necessary.

The detection of a home station 2' having the required identity and power characteristics is used internally by the mobile terminal 1' and/or communicated by radiotelephone to the relay transceiver station 3', used conjointly by the mobile terminal 1' and the home station 2' on the occasion of a particular radiotelephone call. If detection is no longer obtained, the mobile terminal 1' takes account of the absence of detection internally and preferably informs the relay transceiver station 3' to which it is connected of its absence.

The relay transceiver station 3' can be used to inform the home station 2' that its broadcast control channel frequency has been detected by the mobile terminal 1', as reported by radiotelephone by the terminal to the relay station. The information emanating from the terminal is also used to initiate a program of cooperation between the relay transceiver station 3', the mobile terminal 1' and the home station 2'.

Figure 4:
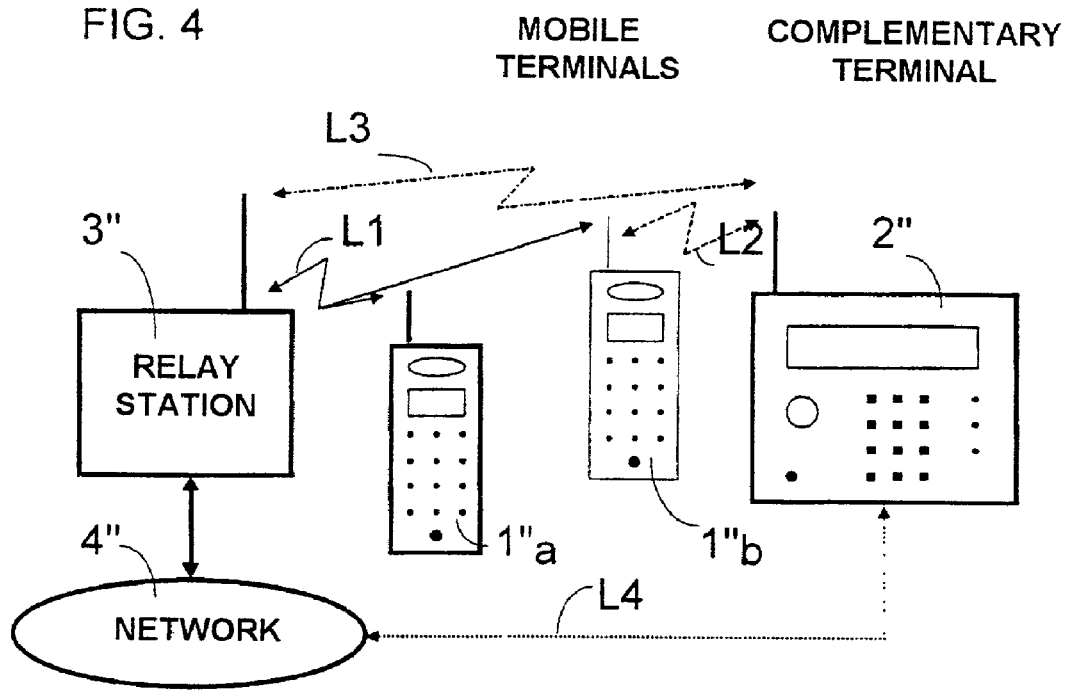
FIG. 4 is a block diagram relating to a communication system including one embodiment of a subscriber radiotelephone terminal unit according to the invention.

In one embodiment of the invention (see FIG. 4) a portable radiotelephone terminal designed to be carried around by a user and consisting of a cordless telephone handset or a mobile network mobile telephone is substituted for the handset connected by a cable to the terminal intended to remain in place and considered as complementary to the first terminal. The mobility of the portable radiotelephone terminal is symbolized in this diagram by two positions 1"*a* and 1"*b* in which the terminal is assumed to be within radio range of a radiotelephone relay transceiver station 3" providing access to a switching network 4" via which a user of the terminal can set up calls to other remote users connected to that network, as symbolized by the radiotelephone link L1. At position 1"*b* the portable radiotelephone terminal is also within radio range of a complementary terminal 2" with which it can then communicate by radio, as symbolized by the radiotelephone link L2.

In one embodiment of the invention the portable radiotelephone terminal is adapted and programmed to serve as a relay between the complementary terminal 2" and the relay transceiver station 3" for exchange of call signals and/or signaling via the two radiotelephone links L2 and L1 connected end-to-end in the portable radiotelephone terminal when it is within radio range of the complementary terminal 2" and the relay station 3". The relay station has radio transceiver means which are more powerful than those of the terminals and in particular than those of the complementary terminal 2". The user of the portable radiotelephone terminal can then obtain the benefit of the additional facilities offered by the complementary terminal 2", when it is within radio range of the complementary terminal. As already mentioned above, those facilities can in particular be the more sophisticated man-machine interface means of the supplementary terminal.

In one embodiment of the invention the portable radiotelephone terminal includes transmit and receive modules enabling it to communicate simultaneously and bidirectionally via a radiotelephone link L1 with a relay transceiver station 3" within whose area it is at least temporarily located and via a radiotelephone link L2 with a complementary terminal 2" it is within radio range of. Operation of the complementary terminal 2" in conjunction with the relay transceiver station 3" is then totally dependent on the presence of the portable radiotelephone terminal within the radio range of the complementary terminal 2", assuming that the portable radiotelephone is also within radio range of the relay transceiver station 3".

In one embodiment of the invention the complementary terminal 2" can instead be adapted to communicate, in particular for signaling purposes, either directly via a bidirectional radiotelephone link L3 with a relay transceiver station 3" within radio range of which it is located, to enable calls to be set up via the communication network 4", or directly via a cable link L4 connecting it to the communication network 4", this link being a conventional landline telephone link, for example. The complementary terminal 2" is then provided with supplementary transmit and receive means for this purpose, either telephone means or radiotelephone means, as appropriate.

In the various embodiments of the invention proposed, the complementary terminal is generally adapted to facilitate and/or make possible operations that are difficult or impossible using only the portable radiotelephone terminal, which is associated with it to form a subscriber radiotelephone terminal unit in which both terminals can be used simultaneously by the same user.

There is claimed:

1. A radiotelephone terminal unit for a subscriber, the radiotelephone terminal unit comprising:
   a portable terminal which is configured to be carried around by a user allowing the user to communicate by radio with a communication network via a relay transceiver station, and
   a radiotelephone terminal which is complementary to the portable radiotelephone terminal, configured to remain in place, the radiotelephone terminal further configured to be used conjointly with the portable terminal when connected to the relay transceiver station by a call set up via the relay transceiver station,
   wherein complementary functions of the radiotelephone terminal and the portable terminal can be employed by a same user having simultaneous access to both of the radiotelephone terminal and the portable terminal, and
   wherein the portable terminal comprises means configured to relay call signals between the radiotelephone terminal and the relay transceiver station.

2. The radiotelephone terminal unit claimed in claim 1, wherein the portable terminal and the radiotelephone terminal are equipped with one of man-machine interface means and software means, which are at least partly complementary.

3. The radiotelephone terminal unit for a subscriber according to claim 2, wherein the software means comprises a program which enables both the portable terminal and the radiotelephone terminal to be active simultaneously in a same call so that signals transmitted to the relay transceiver station can come from either the portable terminal or the radiotelephone terminal when the call is set up.

4. The radiotelephone terminal unit claimed in claim 1, wherein the portable terminal and the radiotelephone terminal include transceiver means and software means enabling them to communicate by radio with the relay transceiver station of the communication network via a respective different radiotelephone link during a call involving the portable terminal.

5. The radiotelephone terminal unit claimed in claim 4, wherein the transceiver means enables the portable terminal to communicate by radio with the relay transceiver station of the communication network via a first link, and with a radiotelephone terminal via a second link when the portable terminal is within radio range of both the relay transceiver station and the radiotelephone terminal.

6. The radiotelephone terminal unit claimed in claim 5, wherein the transceiver means and software means of the portable terminal enables the relay transceiver station and the radiotelephone terminal, to communicate with each other via the radiotelephone links which selectively connect the portable terminal and radiotelephone terminal to the relay transceiver station.

7. The radiotelephone terminal unit claimed in claim 5, wherein the radiotelephone terminal complementary to the portable terminal is connected by a cable link to the communication network to which the portable terminal has radio access via the relay transceiver station.

8. The radiotelephone terminal unit claimed in claim 1, wherein the portable terminal and the radiotelephone terminal have a same calling number.

9. The radiotelephone terminal unit claimed in claim 1, wherein the portable terminal is configured to be carried by the user separate from the radiotelephone terminal which is configured to remain in place.

10. The radiotelephone terminal unit claimed in claim 1, wherein the radiotelephone terminal is situated in a fixed location.

11. The radiotelephone terminal unit claimed in claim 1, wherein the portable telephone and the radio telephone terminal respond conjointly to the call set up by the relay transceiver station.

12. A subscriber radiotelephone terminal configured to communicate by radio with a relay transceiver station providing access to a communication network and with another radiotelephone terminal, the subscriber radiotelephone terminal comprising:
    hardware and software means enabling the subscriber radiotelephone terminal to communicate by radio with the relay transceiver station, the communication with the relay transceiver being either directly or via another subscriber radiotelephone terminal, wherein functions of the subscriber radiotelephone terminal can be used simultaneously with a portable complementary terminal by a same user thereby enabling complementary functions of the subscriber radiotelephone terminal and the portable and complementary terminal to be employed by the same user having simultaneous access to both the subscriber radiotelephone terminal and the portable complementary terminal during a call set up via the relay transceiver stations,
    wherein the portable complementary terminal comprises means configured to relay call signals between the subscriber radiotelephone terminal and the relay transceiver station.

13. The subscriber radiotelephone terminal claimed in claim 12, the subscriber radiotelephone terminal further comprising transmitter means enabling the subscriber radiotelephone terminal to transmit a broadcast control channel carrier with a particular power that can be modified to another radiotelephone terminal, the other radiotelephone terminal comprising means for detecting the broadcast control channel carrier when the other radiotelephone terminal is within radio range of the subscriber radiotelephone terminal, thus enabling the subscriber radiotelephone terminal and the other radiotelephone terminal to communicate simultaneously and conjointly with the relay transceiver station of the communication network.

14. The subscriber radiotelephone terminal claimed in claim 12, further comprising receiver means enabling the subscriber radiotelephone terminal to detect a broadcast control channel carrier transmitted by another subscriber radiotelephone terminal when the subscriber radiotelephone terminal is within radio range of the other subscriber radiotelephone terminal, thereby enabling the subscriber radiotelephone terminal and the other radiotelephone terminal to communicate simultaneously and conjointly with the relay transceiver station of the communication network as a terminal having all of the functions specific to each of the two subscriber radiotelephone terminals.

15. The subscriber radiotelephone terminal claimed in claim 12, wherein the subscriber radiotelephone terminal is a portable radiotelephone terminal configured to be carried around by a user, the portable radiotelephone terminal comprising transceiver means enabling the portable radiotelephone terminal to communicate simultaneously by radio with the relay transceiver station and with a complementary radiotelephone terminal which is preferably intended to be left in place, the portable radiotelephone terminal serving as a communication relay for the complementary radiotelephone terminal, when the portable radiotelephone terminal is within radio range of the complementary radiotelephone terminal and the relay transceiver station.

16. The subscriber radiotelephone terminal claimed in claim 12, wherein the subscriber radiotelephone terminal is adapted to be left in place, the subscriber radiotelephone terminal further including a cable link enabling the subscriber radiotelephone terminal to set up a call via the communication network.

17. The subscriber radiotelephone terminal claimed in claim 12, further including one of hardware and software means enabling the subscriber radiotelephone terminal to communicate by radio with the relay transceiver station which provides access to the communication network conjointly with a complementary radiotelephone terminal during a call, in the course of which functional man-machine interface means of the subscriber radiotelephone terminal, which complement functional man-machine interface means of the complementary radiotelephone terminal, can be used in conjunction with the functional man-machine interface means of the complementary radiotelephone terminal by the same user during the call.

18. The radiotelephone terminal unit claimed in claim 12, wherein the subscriber radiotelephone terminal further comprising:

transmitter means enabling the subscriber radiotelephone terminal to transmit a broadcast control channel carrier with a particular power that can be modified to another radiotelephone terminal, the other radiotelephone terminal comprising means for detecting the broadcast control channel carrier when the other radiotelephone terminal is within radio range of the subscriber radiotelephone terminal; and receiver means enabling the subscriber radiotelephone terminal to detect another broadcast control channel carrier transmitted by the other subscriber radiotelephone terminal when the subscriber radiotelephone terminal is within radio range of the other subscriber radiotelephone terminal, wherein the subscriber radiotelephone terminal and the other subscriber radiotelephone terminal are enabled by the transmitter means and the receiver means to communicate simultaneously and conjointly with the relay transceiver station of the communication network as a terminal having all of the functions specific to each of the two subscriber radiotelephone terminals.

* * * * *